United States Patent [19]

Miller et al.

[11] Patent Number: 4,463,558
[45] Date of Patent: Aug. 7, 1984

[54] LOAD SENSING HYDRAULIC SYSTEM

[75] Inventors: James A. Miller, Cedar Falls; Derek M. Eagles, Hudson, both of Iowa

[73] Assignee: Deere & Company, Moline, Ill.

[21] Appl. No.: 522,933

[22] Filed: Aug. 12, 1983

[51] Int. Cl.³ .................... F16D 31/00; B62D 5/08
[52] U.S. Cl. .................................. 60/422; 60/384;
60/427; 91/518; 137/596; 180/132
[58] Field of Search .............. 60/422, 384, 385, 387,
60/420, 427; 91/514, 516, 517, 518; 180/132;
137/596, 596.13

[56] References Cited

U.S. PATENT DOCUMENTS

| | | | |
|---|---|---|---|
| 2,892,311 | 6/1959 | Van Gerpen | 60/52 |
| 2,892,312 | 6/1959 | Allen et al. | 60/52 |
| 3,750,405 | 8/1973 | Lech et al. | 60/422 |
| 4,034,563 | 7/1977 | Orth | 60/422 |
| 4,044,786 | 8/1977 | Yip | 137/101 |
| 4,116,001 | 9/1978 | Orth | 60/420 |
| 4,292,805 | 10/1981 | Acheson | 60/450 |
| 4,293,284 | 10/1981 | Carlson | 417/218 |
| 4,337,620 | 7/1982 | Johnson | 60/422 |
| 4,343,151 | 8/1982 | Lorimor | 91/516 |
| 4,345,614 | 8/1982 | Karlberg et al. | 60/384 |

Primary Examiner—Robert E. Garrett

[57] ABSTRACT

A load sensing hydraulic system is disclosed which essentially eliminates kickback from a feedback mechanism contained in a manually operable control valve which in turn is fluidly connected to a hydraulic function. The system includes a power on demand pump fluidly connected between a reservoir and the control valve for supplying pressurized fluid to the hydraulic function. A load signal line is also connected between the control valve and the pump which serves to transmit pressure signals, which are generated by loads acting on the hydraulic function, to the pump for controlling the pressurized output thereof. A load signal control valve is positioned in the load signal line and is fluidly connected to the discharge side of the pump. The load signal control valve is capable of sensing pressure variations between the fluid discharged by the pump and the upstream fluid present in the load signal line. As soon as the control valve senses that the pressure of the fluid discharged by the pump is less than the upstream pressure of the fluid in the load signal line, it moves to block off fluid flow from the hydraulic function and thereby eliminates kickback on the manually operable control member.

12 Claims, 1 Drawing Figure

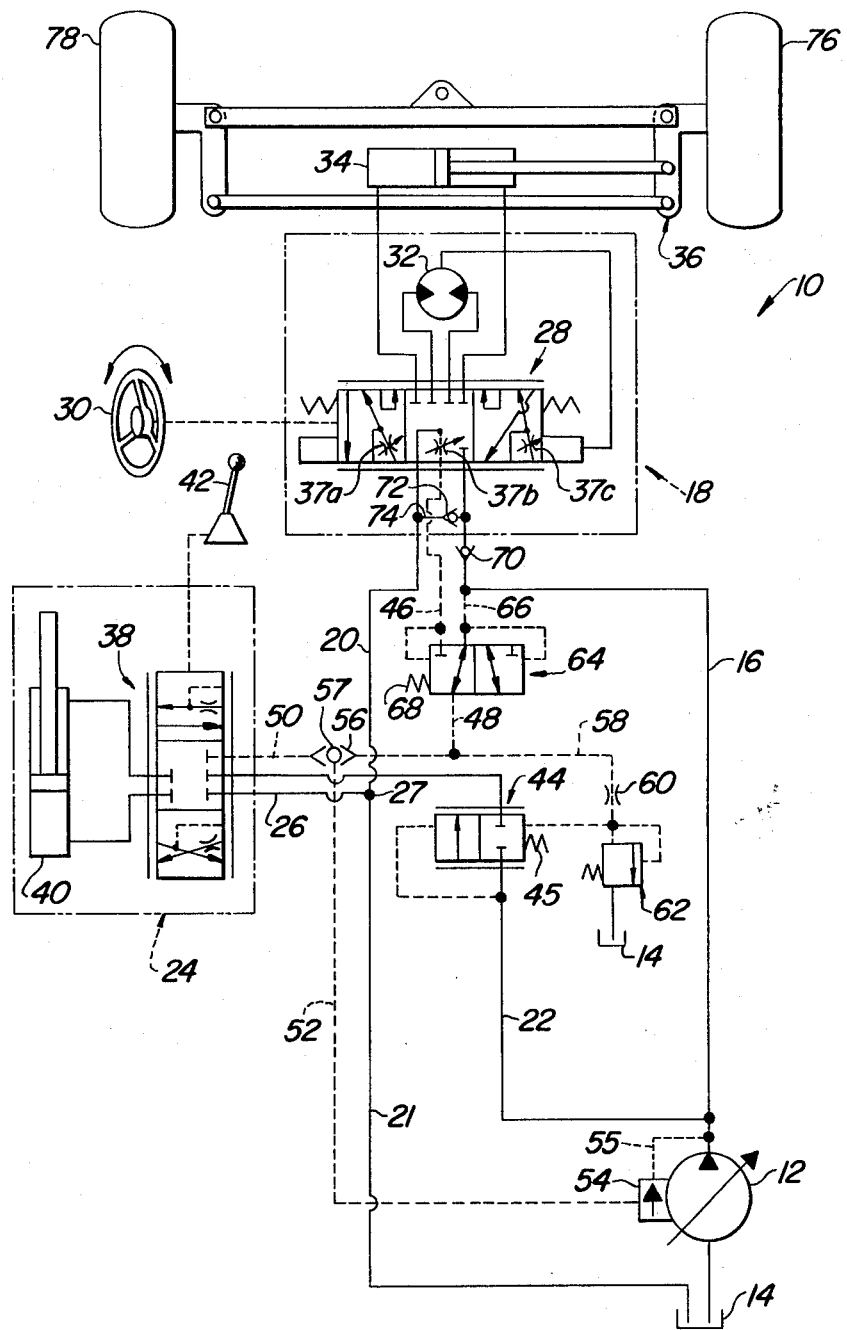

LOAD SENSING HYDRAULIC SYSTEM

FIELD OF THE INVENTION

This invention relates to a load sensing hydraulic system and more particularly to a system which eliminates kickback from a feedback mechanism contained in a control valve which is fluidly connected to a hydraulic function.

BACKGROUND OF THE INVENTION

Currently, some agricultural and industrial equipment manufacturers design and construct vehicles which utilize load sensing systems. A load sensing system is one which varies the pump flow and fluid pressure to meet a load requirement and has one hydraulic function which has preference over other hydraulic functions. For example, the steering function of a vehicle may have priority over the hydraulic function which controls the movement of an attached implement. Besides steering, load sensing systems are useful on tractors and backhoe loaders where a single pump may be utilized to provide fluid to such devices as a brake unit, a differential lock or a hydraulic hitch as well as secondary circuits for other hydraulic devices such as actuators of selective control valves.

Some examples of load sensing systems are taught in U.S. Pat. Nos. 2,892,311, 4,034,563 and 4,116,001. These and other currently available systems are rather complicated in construction and costly because the power required by the primary circuit requires a variable flow rate at various pressures while still having priority over the secondary circuits. A further disadvantage of current load sensing systems, especially those used for steering, is that a kickback produced in the control valve is relayed through the steering wheel to the operator as pressure fluctuations occur within the system. Such kickbacks can become annoying to the operator and therefore there is a desire to essentially eliminate them.

SUMMARY OF THE INVENTION

Briefly, this invention relates to an uncomplicated load sensing hydraulic system which essentially eliminates kickback from a feedback mechanism contained in a manually operable control valve which is fluidly connected to a hydraulic function. The system includes a power on demand pump fluidly connected between a reservoir and the control valve for supplying pressurized fluid to the hydraulic function. A load signal line is also connected between the control valve and the pump and serves to transmit pressure signals, which are generated by loads acting on the hydraulic function, to the pump for controlling the pressurized output thereof. A valve is positioned across the load signal line and is fluidly connected to the discharge side of the pump. The valve is capable of sensing pressure variations between the fluid discharge by the pump and the fluid present in the load signal line. When the valve senses that the pressure of the fluid discharged by the pump is less than the pressure of the fluid in the load signal line, it moves to block off fluid flow from the hydraulic function and thereby eliminates kickback on the manual control member.

The general object of this invention is to provide a load sensing hydraulic system which can eliminate kickback from a feedback mechanism contained in a manually operable control valve fluidly connected to a hydraulic function. A more specific object of this invention is to provide a closed center hydraulic steering system wherein the steering function has priority over other hydraulic functions.

Another object of this invention is to provide a simple and economical load sensing hydraulic system for a vehicle.

Still further, an object of this invention is to provide a load sensing hydraulic system wherein kickback is eliminated from the steering wheel of the vehicle.

Other objects and advantages of the present invention will become more apparent to those skilled in the art in view of the following description and the accompanying drawing.

BRIEF DESCRIPTION OF THE DRAWING

The FIGURE is a schematic diagram of a load sensing hydraulic system.

DETAILED DESCRIPTION OF THE PREFERRED EMBODIMENT

Referring to the FIGURE, a load sensing hydraulic system 10 is shown which controls the steering of a vehicle, for example, an agricultural or industrial tractor. The system 10 includes a power on demand, variable displacement pump 12 which is fluidly connected to a reservoir 14. The pump 12 supplies pressurized fluid through a first supply line 16 to a primary work circuit 18. The primary work circuit 18 is in turn connected to the reservoir 14 by return lines 20 and 21. The pump 12 is also connected by a second supply line 22 to a secondary work circuit 24 which is in turn connected by lines 26 and 21 to the reservoir 14. The conduits 20 and 26 are joined together at point 27 to form the single line 21.

The load sensing hydraulic system 10 is designed such that the primary work circuit 18 has priority over the secondary work circuit 24. Although, as depicted, the primary work circuit 18 is a steering circuit, other hydraulic circuits for operating a brake or differential lock could also be utilized. As shown, the primary work circuit 18 includes a steering valve 28 which is movably actuated by a manually operable steering wheel 30 and by a fluidly activated geroter 32. The fluid output of the steering valve 28 is directed to the ends of a hydraulic cylinder 34 so as to control the movement of a steering linkage 36. The physical construction and connection of the steering valve 28 to the geroter 32 and to the hydraulic cylinder 34 are all well-known to those skilled in the art. It should be noted, however, that the steering valve 28 is shown as being a three position valve having three distinct orifices 37 a, b, and c for metering fluid flow therethrough.

The secondary work circuit 24 also contains a hydraulic valve 38 which is fluidly connected to the ends of a hydraulic cylinder 40. The hydraulic cylinder 40 can be used in numerous applications, one example being the raising or lowering of an implement which is attached to the vehicle. Preferably, the hydraulic valve 38 will be mechanically activated by a lever mechanism 42.

A priority valve 44 is positioned in the second supply line 22 and is movable between an open and a closed position to control pump system pressure, if needed, by restricting the flow of fluid from the pump 12 to the secondary work ciruit 24. Preferably, the priority valve 44 is biased by a spring 45 towards a closed position, wherein fluid flow through the second supply line 22 is restricted or blocked. The priority valve 44 is movable by the fluid pressure in the second supply line 22 to an open position wherein fluid is allowed to flow to the hydraulic valve 38.

The load sensing hydraulic system 10 also includes load signal lines 46, 48, 50 and 52. The load signal lines 46, 48, and 52 fluidly connect the primary work circuit 18 to a compensator 54 while the load signal lines 50 and 52 fluidly connect the secondary work circuit 24 to the compensator 54. The compensator 54 is a device well-known to those skilled in the art which is attached to and controls the stroke of the pump 12 based on the pressure difference between the supply line 16 and the signal line 52. The pressure in the supply line 16 is conveyed to the compensator 54 via a sense passage 55. By varying the stoke of the pump 12, the fluid flow out of the pump 12 is regulated. The load signal lines 46, 48, 50 and 52 are capable of transmitting pressure signals which are generated by loads acting on the hydraulic cylinders 34 and 40 to the compensator 54 such that the compensator 54 can control the discharge of the pump 12. In order to ensure that the pressure sensed by the compensator 54 is the higher of the two fluid pressures contained in the primary and secondary work circuits 18 and 24, respectively, a double-check valve 56 is situated at an intersection point 57 of the lines 48, 50 and 52.

Branching off the load signal line 48 is another load signal line 58 which conveys fluid to the right-hand end of the priority valve 44. When this fluid is pressurized, it will assist the spring 45 in urging the priority valve 44 leftward, toward its closed position. The pressurized fluid in the load signal line 58, along with the spring 45, thereby cooperate with the pump 12 to regulate fluid flow to the secondary work circuit 24. This assures the adequate fluid flow and pressure is always available from the pump 12 to the primary work circuit 18. An orifice 60 is positioned across the load signal line 58 to meter flow therethrough and a relief valve 62 is fluidly connected downstream of the orifice 60 to relieve excessive pressure from the system 10. Preferably, the relief valve 62 is arranged in a parallel relationship to the priority valve 44. In such priority load steering systems, when a combination of a reverse pressure difference across and a reverse flow through the geroter 32 occurs, a torque develops which causes the steering valve 28 to rotate in a direction opposite to the direction in which the operator has turned the steering wheel 30. This opposite rotation of the steering valve 28 causes a kickback of the steering wheel 30 which is undesirable. The present load sensing system 10 eliminates this kickback by using a load signal control valve 64 which joins the load signal lines 46 and 48 together and which is fluidly connected to the first supply line 16 by a line 66. The load signal control valve 64 is preferably a three-way, two-positioned valve which is biased both by a spring 68 and by fluid pressure to a first position (as shown) wherein the first supply line 16 is fluidly connected, via line 66, to the load signal line 48. It should be noted that the fluid pressure used to bias the control valve 64 towards its first position is the fluid pressure present in the load signal line 46. The control valve 64 is movable leftward to a second position by fluid pressure present in the lines 16 and 66 which acts on the right end of the valve 64. In the second position, the steering valve 28 is fluidly connected by the lines 46, 48 and 52 to the compensator 54 and by the lines 46, 48 and 58 to the priority valve 44.

The control valve 64 is capable of sensing pressure variations between the fluid in the first supply line 16 and the fluid in the load signal line 46 and is movable in response to such pressure variations to prevent fluid flow out of the primary work circuit 18 when the fluid pressure in the first supply line 16 is less than the fluid pressure in the load signal line 46. By preventing fluid flow out of the steering valve 28, one eliminates the fluid flow path for reverse fluid flow through the gerotor 32 and thereby eliminates an opposite force from acting on the steering valve 28 which would cause the steering wheel 30 to kickback.

The load sensing hydraulic system 10 further includes a one-way check valve 70. This check valve 70 is positioned in the first supply line 16 between the point where the control valve 64 is connected to the first supply line 16 and the point where the first supply line 16 is connected to the steering valve 28. This check valve 70 prevents the reverse flow of fluid out of the primary work circuit 18 through the first supply line 16. A second one-way check valve is positioned in a line 74 which connects the return line 20 to the first supply line 16. The check valve 72 permits fluid flow from the return line 20 to the first supply line 16 should the operator's input to the steering wheel 30 be greater than the flow available from the pump 12. When this occurs, flow normally routed back to the reservoir 14 is used to fill the first supply line 16 and prevent the first supply line 16 from cavitating.

It should be noted that although the load sensing hydraulic system 10 has been described as having a primary work circuit 18 and a secondary work circuit 24, it is possible to construct a system having but one work circuit such that kickback is eliminated from the single hydraulic function. In such a system, there would be no need for the priority valve 44 since all of the flow would be directed to and away from the single hydraulic function.

OPERATION

The operation of the load sensing hydraulic system 10 will now be explained with the steering linkage 36 being attached to the front portion of a vehicle. The vehicle has a right-front wheel 76 and a left-front wheel 78. Also, various pressure values will be assigned to triggering the movement of certain valves in order to acquaint the reader with the system. It should be understood that the invention is not to be limited to these values.

Starting from a condition wherein the engine of the vehicle is not running, the power on demand pump 12 will not be operating. At this time, the steering valve 28 will be in its neutral position, the hydraulic cylinder is depressurized, the priority valve 44 will be closed and the control valve 64 will be in its first position, all of which are indicated in the Figure. as soon as the operator starts the engine, the pump 12 will start at full stroke to pump fluid through the first supply line 16 to the steering valve 28. Since the steering valve 28 is in its neutral position, fluid flow through the steering valve 28 will be blocked and the fluid pressure will rise within the first supply line 16. As the pressure rises and reaches about 50 psi, which represents the force needed to compress the spring 68, the control valve 64 will shift to its second position. In its second position, the control valve 64 blocks the flow of pressurized fluid from the first supply line 16 to the line 48 while connecting the line 48 to the reservoir 14, via line 46, the orifice 37b and the return lines 20 and 21. As the pressure discharged from the pump 12 builds to about 150 psi, this pressure will be conveyed through the second supply line 22 and will cause the priority valve 44 to move rightward to its open position against the force of the spring 45. With the priority valve 44 in its open position, pressurized fluid is routed to the control valve 38 of the secondary work circuit 24. Assuming the control valve 38 is in its neutral position, as shown, no fluid will be able to pass through it. The pump 12 will continue operating to build pressure until it reaches a value of about 300 psi, which represents the setting of the compensator 54. At this point, the pressure difference across the compensator 54 will be balanced such that the pressure developed by the pump 12 will rise no higher. The load sensing hydraulic system 10 is then in a standby condition.

NORMAL STEER OPERATION

Should the operator then turn the steering wheel 30 to the right, the steering valve 28 will move rightwards in a metering manner such that the left-hand portion of the steering valve 28 will be aligned with the fluid passages leading to the gerotor 32 and to the hydraulic cylinder 34. As this happens, the first supply line 16 is fluidly connected to the line 46 via the orifice 37a and the pressure in the line 46 will increase to that of the pressure in the first supply line 16. With the pressures being equal in both the first supply line 16 and in the line 46, the spring 68 will move the control valve 64 rightward to its first position, as shown. Simultaneously fluid pressure from the first supply line 16 will be directed to both the priority valve 44 and to the compensator 54 via lines 48 and 58 and lines 48 and 52, respectively. Also, a flow path will be established from the first supply line 16 into the left-hand side of the gerotor 32, out the right-hand side of the gerotor 32 and into the right-hand or rod end of the hydraulic cylinder 34. At the same time, a second flow path will be established from the left-hand or head end of the hydraulic cylinder 34 via the return lines 20 and 21 to the reservoir 14. The wheels 76 and 78 will turn righward once adequate pressure is obtained within the hydraulic cylinder 34 to move the piston. If hypothetically, for example, it takes 900 psi to move the piston within the hydraulic cylinder 34, then the pressure from the pump 12 would increase from the standby pressure of 300 psi to the hypothetical 900 psi value and the wheels 76 and 78 will begin to turn. The pump 12 will continue to supply pressurized fluid flow to the hydraulic cylinder 34 and the fluid pressure will increase in the first supply line 16 until the pressure drop across the orifice 37a reaches our hypothetical 300 psi value. At this time, the pressure in the first supply line 16 will be 1200 psi (900 psi and 300 psi). It should be noted that as the pressure was increasing from the hypothetical 900 psi to 1200 psi, the control valve 64 and the priority valve 44 both shifted to their second positions. This occurred when the pressure drop across the orifice 37a reached 50 psi and 150 psi respectively, as explained above in the preceding section entitled "Operation". With the pressure at 1200 psi, the pump 12 will continue to supply the needed pressurized fluid for turning the wheels 76 and 78 as long as the operator is turning the steering wheel 30. Once the operator stops turning the steering wheel 30, the steering valve 28 recenters to its neutral position and the line 46 is drained of fluid via the orifice 37b and the return lines 20 and 21. The compensator 54 senses the pressure variation between the fluid in the first supply line 16, via the sense passage 55, and the absense of pressure in the line 52 and destrokes the pump 12 back to the standby condition of 300 psi.

STEERING AGAINST A FORCE ACTING ON THE WHEELS

Should a situation arise where an external force is acting on at least one of the wheels, for example when one of the wheels is in a rut and has an external force acting on it such as to force it to the left, and the operator tries to turn the steering wheel 30 to the right, the load sensing hydraulic system 10 would function in the following way. Starting from the standby position, the steering valve 28 will move to the right such that the orifice 37a is aligned with the first supply line 16 and the pressurized fluid therein will be fluidly connected to the rod end of the hydraulic cylinder 34. At the same time, the head end of the hydraulic cylinder 34 will be fluidly connected to the reservoir 14 via the return lines 20 and 21. Pressurized fluid in the rod end of the hydraulic cylinder 34, which incidentally will be higher than system pressure, will feed back through the gerotor 32 and through the line 46 to the control valve 64. This pressurized fluid, which is at a higher pressure than the fluid in the first supply line 16, will cause the control valve 64 to move righward to its first position, as shown. With the control valve 64 in its first position, reverse flow of fluid out of the rod end of the hydraulic cylinder 34 and through the gerotor 32 is prevented. By eliminating the reverse flow of fluid through the gerotor 32, kickback at the steering wheel 30 is prevented.

Once the control valve 64 has moved to its first position, the hydraulic system 10 will operate as described above in the section entitled "Normal Steer Operation" starting from the point where the control valve 64 has just moved rightward and the pressure in the first supply line 16 is connected by lines 66, 48 and 52 to the compensator 54.

PRIORITY FLOW OPERATION

The load sensing hydraulic system 10 will function as follows when fluid is being supplied to the secondary work circuit 24 at the time that fluid is required by the primary work circuit 18. Starting from a position wherein the control valve 64 is in its second position and the priority valve 44 is open, flow from the pump 12 would be directed to the secondary work circuit 24 through the second supply line 22. Let us assume that the power on demand pump 12 is operating at full stroke producing 800 psi to satisfy an 800 psi load requirement of the secondary work circuit 24. At this time, the operator desires to turn the vehicle's wheels 76 and 78 to the right and therefore turns the steering wheel 30 rightwards. As mentioned above, the pressure needed to move the piston within the hydraulic cylinder 34 is 900 psi of pressure. Rotation of the steering wheel 30 causes the steering valve 28 to move righwards such that the fluid pressure in the first supply line 16 is directed to the rod end of the hydraulic cylinder 34. Since the pressure is only at 800 psi, it will not be able to move the piston within the hydraulic cylinder 34. Simultaneously, the fluid in the first supply line 16 will be routed through the steering valve 28 via the orifice 37a and the line 46 to the left-hand end of the control valve 64. This fluid pressure, together with the force of the spring 68, will urge the control valve 64 to its first position, as shown. In this position, the 800 psi of pressure in the first supply line 16 will be sensed in the lines 66 and 48 so as to move the ball of the double check valve 56 leftwards closing off the load signal line 50. It should be noted that although the hydraulic cylinder 40 operates at 800 psi of pressure, there is actually slightly less than 800 psi sensed in the line 50 due to various pressure drops within the secondary work circuit 24. For this reason, the ball of the double check valve 56 will move leftward when 800 psi impinges on its right surface thereby closing off line 50. This means that the 800 psi of pressure can be transmitted through the line 52 to the compensator 54. The 800 psi of pressure in line 48 will also be conveyed through the branch line 58 and the orifice 60 such that the priority valve 44 will start to move leftwards towards a closed position and restrict fluid flow therethrough. With the pump 12 receiving an input signal of 800 psi it will continue to operate at full stroke but due to the leftward movement of the priority valve 44 a restriction occurs which causes a pressure drop thereacross. This restriction will cause the pressure in the supply lines 16 and 22 to increase. When the pressure reaches approximately 900 psi, fluid will start to flow through the steering valve 28 to the hydraulic cylinder 34. The new pressure value will be sensed in the lines 46, 48 and 52 as well as in the line 58 which causes the priority valve 44 to close further. Once the pressure in the supply lines 16 and 22 reaches a value of about 950 psi, and remembering that there is a 50 psi pressure drop across the orifice 37a and that it takes 50 psi to compress the spring 68, the control valve 64 will start to shift towards its second position. The pressure in the supply lines 16 and 22 will continue to increase to say about 1050 psi, which is equal to 900 psi coming from the steering load, downstream of orifice 37a through the lines 46, 48 and 58 which in turn acts on the right side of the priority valve 44, plus 150 psi which represents the compressive force of the spring 45. As long as the operator continues to turn the steering wheel 30 rightward, the above condition will be maintained.

Once the operator stops turning the steering wheel 30, the control valve 28 will move to its neutral position and the fluid in lines 46, 48 and 58 will drain back through the orifice 37b, via the return lines 20 and 21, to the reservoir 14 and the pressure in these lines will drop to essentially zero. This drop in pressure will cause the ball of the double-check valve 56 to move rightward blocking the reverse flow of fluid from the lines 50 and 52 into the lines 48 and 58. As the pressure in the line 58 decreases, the priority valve 44 will move rightward towards its open position due to the pressure in the second supply line 22. As the priority valve 44 opens, the restriction thereacross is reduced and full flow at 800 psi is routed to the secondary work circuit 24. In the mean time, the pressure produced by the power on demand pump 12 is reduced from 1050 psi to 800 psi because the above mentioned restriction in the priority valve 44 has been virtually eliminated.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A load sensing hydraulic system comprising:
   (a) a control valve having a feedback mechanism connected thereto, said control valve regulating fluid flow to a hydraulic function;
   (b) a power on demand pump fluidly connected between a source of fluid and said control valve for supplying pressurized fluid thereto;
   (c) a load signal line connected between said control valve and said pump for transmitting pressure signals, generated by loads acting on said hydraulic function, to said pump thereby controlling the pressure of fluid discharged by said pump; and
   (d) means for sensing pressure variations between fluid discharged from said pump and fluid present in said load signal line and for preventing fluid flow out of said hydraulic function via said load signal line when the pressure of said fluid discharged by said pump is less than the pressure of said fluid in said load signal line.

2. The load sensing hydraulic system of claim 1 wherein said means is a three-way, two-position valve.

3. The load sensing hydraulic system of claim 1 wherein said power on demand pump is a pressure and flow controlled variable displacement pump.

4. A load sensing hydraulic system which essentially eliminates kickback from a feedback mechanism contained in a control valve fluidly connected to a hydraulic function, said system comprising:
   (a) a reservoir capable of holding a quantity of fluid;
   (b) a power on demand pump fluidly connected between said reservoir and said control valve for supplying pressurized fluid thereto;
   (c) a load signal line connected between said control valve and said pump for transmitting pressure signals, generated by loads acting on said hydraulic function, to said pump thereby controlling the pressure of fluid discharge by said pump; and
   (d) valve means for sensing pressure variations between fluid discharged from said pump and fluid present in said load signal line and being movable relative to such pressure variations to prevent fluid flow out of said hydraulic function via said load signal line when the pressure of said fluid discharged by said pump is less than the pressure of said fluid in said load signal line.

5. A load sensing hydraulic system which assures that a primary work circuit has priority in flow demand over a secondary work circuit and which essentially eliminates kickback from a primary control valve with a feedback mechanism contained in said primary work circuit, said system comprising:
   (a) a reservoir capable of holding a quantity of fluid;
   (b) a power on demand pump fluidly connected to said reservoir;
   (c) first and second fluid conduits connecting said pump to said primary control valve and said primary control valve to said reservoir, respectively;
   (d) third and fourth fluid conduits connecting said pump to a secondary control valve contained in said secondary work circuit and connecting said secondary control valve to said reservoir, respectively;
   (e) a priority valve connected across said third conduit and being movable between an open and a closed position to control fluid flow from said pump to said secondary work circuit;
   (f) first and second interconnected load signal lines connecting said primary work circuit and said secondary work circuit, respectively, to said pump and being capable of transmitting a load signal pressure from said respective circuits to said pump for controlling the operation thereof;

(g) a double-check valve positioned at the point of connection of said first and second load signal lines for ensuring that said line containing the higher fluid pressure will be in communication with said pump;

(h) a branch line connecting said first load signal line upstream of the point of connection of said first load signal line to said second load signal line, to said priority valve for conveying pressurized fluid thereto which urges said priority valve toward said closed position, said priority valve cooperating with said pump for regulating fluid flow towards said secondary work circuit thereby assuring that adequate fluid flow and pressure is available from said pump to said primary work circuit;

(i) an orifice positioned across said branch line for metering fluid flow therethrough;

(j) a relief valve positioned downstream of said orifice and in parallel with said priority valve, said relief valve being set to open at a predetermined pressure value for relieving fluid pressure above said predetermined value from said branch line; and (k) valve means for sensing pressure variations between fluid in said first conduit and fluid in said first load signal line and being movable relative to such pressure variations to prevent fluid flow out of said primary work circuit via said load signal line when fluid pressure present in said first conduit is less than fluid pressure present in said first load signal line.

6. The load sensing hydraulic system of claim 5 wherein said valve means is a three-way, two-position load signal control valve.

7. The load sensing hydraulic system of claim 6 wherein said load signal control valve is spring biased toward a first position in which said first conduit is fluidly connected to said first load signal line and is biased by fluid pressure within said first conduit toward a second position in which said first load signal line is connected to said reservoir.

8. The load sensing hydraulic system of claim 5 wherein said power on demand pump is a pressure and flow controlled variable displacement pump.

9. The load sensing hydraulic system of claim 5 wherein said power on demand pump has a compensator connected thereto which limits the pressurized output of said pump.

10. The load sensing hydraulic system of claim 5 wherein said priority valve is a two-way, two-position valve which is biased toward said closed position.

11. The load sensing hydraulic system of claim 10 wherein said priority valve is biased toward said closed position by both a fluid pressure force and by a spring force.

12. The load sensing hydraulic system of claim 5 wherein a one-way check valve is positioned across said first conduit between the point where said valve means is connected to said first conduit and the point where said first conduit is connected to said primary work circuit for preventing reverse flow of fluid out of said primary work circuit.

* * * * *